Aug. 25, 1959    M. E. C. FREEMAN    2,901,013
FRUIT HOLDER
Filed June 13, 1955
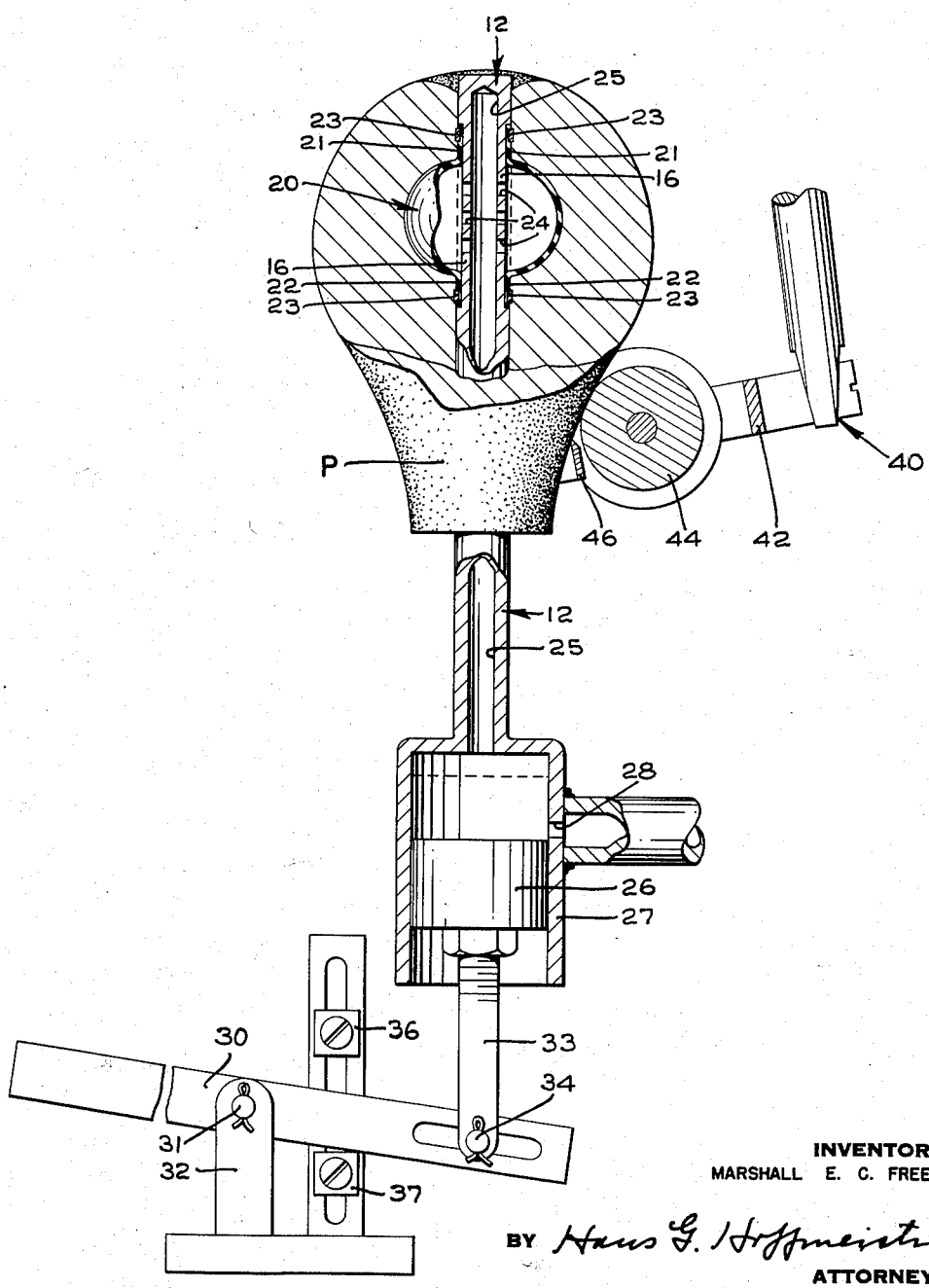
INVENTOR
MARSHALL E. C. FREEMAN
BY Hans G. Hoffmeister
ATTORNEY

United States Patent Office 2,901,013
Patented Aug. 25, 1959

2,901,013

FRUIT HOLDER

Marshall E. C. Freeman, San Jose, Calif., assignor to Food Machinery and Chemical Corporation, San Jose, Calif., a corporation of Delaware Application June 13, 1955, Serial No. 514,991

5 Claims. (Cl. 146—43)

This invention pertains to a fruit preparation machine, and more particularly relates to an improved device for supporting a piece of fruit while a processing operation, such as peeling, is performed on the fruit.

Certain types of fruit, such as pears, are usually peeled while they are held on cylindrical stemming tubes. During the peeling operation, axial forces are exerted on each fruit tending to slide it off the stemming tube. It is an object of the present invention to provide a device adapted to hold a fruit firmly in position on a support tube during a peeling operation.

Another object is to provide a fruit holding device capable of simultaneously resisting forces tending to slide the fruit in an axial direction and forces tending to rotate the fruit about its longitudinal axis.

Another object is to provide an efficient inflatable fruit holder.

Other and further objects and advantages of the invention will become apparent from the following detailed description taken in conjunction with the accompanying drawing which is a front elevation, with parts broken away and parts in section, of the fruit holder of the present invention.

While the present fruit holder is particularly useful for holding pears during peeling, it will be understood that it has general utility in firmly gripping and positioning any fruit which is cored during an early step of its preparation, prior to the processing of its outer surface. In the peeling of pears, the stem of the pear is cut off and the core is removed by punching an axial hole in the pear by means of a stemming tube. A rotary knife is then moved into the hole and rotated to cut out and chop up the seed cell. When the seed cell has been chopped up, the knife is retracted and a stream of water is directed into the interior of the pear to wash out the pieces of seed cell.

In the drawing, a pear P, that has been cored and seed-celled, is shown in position on a cylindrical tubular support member 12. The tubular member 12 has a reduced diameter portion 16 providing a recess adapted to receive a short length of rubber tubing 20 which normally lies close against the reduced portion 16 of the member 12, as indicated by the dotted line position. The rubber tubing is secured adjacent its end portions 21 and 22 to the outer surface of the support member 12 by bonding the tubing to the metal or by suitable bands or straps 23 that press the rubber tubing tightly against the metal surface. A plurality of lateral passages 24 are provided in the wall of the support member 12 opposite the intermediate section of the rubber tubing 20.

The rubber tubing 20 is expanded into firm gripping engagement with the walls of the seed cell by means of a fluid, which may be a gas, a liquid, or a combination of gas and liquid. This fluid is introduced into the central passage 25 of the tubular member 12 and is then forced through the lateral passages 24 into contact with the rubber tubing which will expand in proportion to the amount of pressure exerted by the fluid.

If a liquid fluid is used to expand the rubber tubing, the amount of expansion will depend upon the volume of liquid forced into the rubber tubing. In the disclosed embodiment of the invention, a constant volume of liquid is forced into the rubber tubing by means of a piston 26 mounted for reciprocation in a power cylinder 27 which communicates with the central passage 25. Fluid is delivered to the power cylinder 27 through an inlet opening 28. When the cylinder 27 and the central passage 25 are substantially filled with low pressure liquid, the amount that the rubber tubing expands will depend upon the distance the piston travels inwardly of the cylinder after it closes the inlet opening 28. The piston is reciprocated in the cylinder by means of a lever 30 that is pivotally mounted by a fulcrum pin 31 on a stationary post 32 and is pivotally connected at 34 to a rod 33 which is adjustably threaded into the piston. Since the size of the seed cells may vary, it is desirable that the amount of travel of the piston can be regulated. In the disclosed embodiment, a pair of adjustable stops 36 and 37 limit the swing of the lever 30. Accordingly, the travel of the piston may be varied by shifting either or both of the stops to increase or decrease the range of swinging movement of the lever.

If a gas is used to inflate the rubber tubing, the piston 26 and the power cylinder 27 may be used to supply the gas. Alternately, the lower end of the tubular support member 12 may be closed and a conduit, that is connected to a source of gas at constant pressure, may be connected directly into the central passage 25 of the support member 12. The amount of inflation of the rubber tubing will depend upon the pressure of the gas.

When a pear is held in fixed position on the inflated holder, the outer surface of the pear may be processed in any desirable manner, as for example, the pear may be peeled by subjecting the surface to the action of a peeling cutter 40. The illustrated cutter 40 is of the type described in the patent to Thompson et al. No. 2,139,704 and comprises, in general, a frame support 42, a fruit engaging spool 44, and a cutting blade 46. The cutter is arranged to be moved in a direction longitudinally of the pear from stem end to butt end to cut longitudinal strips of peel from the pear. As the cutter moves along the surface of the pear it tends to pull the pear in an axial direction off the support member 12. It will be evident that the inflated holder resists this axial force and prevents axial displacement of the pear. If the pear is peeled by means of a knife that applies a pressure against the pear tending to rotate the pear relative to the support member 12, the inflated rubber tubing will prevent such rotation.

It will, of course, be recognized that, while an inflatable fruit holder made of rubber tubing is illustrated, any material that is capable of being inflated or expanded may be successfully used. Also, it is evident that the support member 12 may have a cross-section other than the circular cross-section illustrated.

Having thus described my invention, what I claim as new and desire to protect by Letters Patent is:

1. In a holder for a fruit from which the core and seed cell has been removed leaving an axial hole and a seed cell cavity in the fruit, the combination of an elongated rod having a sectional configuration and size adapting said rod for positioning in the axial hole of a cored fruit with the exterior wall of the rod in close engagement with the wall of the axial hole throughout substantially the entire length of the hole, said rod having a portion opposite the seed cell cavity, a balloon-like inflatable member anchored to said support member at the portion opposite the seed cell cavity, means providing a passageway through said support member to the inside of said inflatable member, and means communicating with said passageway for directing fluid under pressure through said passageway into said inflatable member to expand said inflatable member into contact with the wall of the seed cell cavity.

2. In a holder for a fruit having a cavity formed therein, the combination of a tubular member having a portion adapted to be positioned in the cavity in the fruit, an inflatable member disposed around the projecting portion of said tubular member, means providing lateral passages communicating the interior of said inflatable member with the central passage of said tubular member, a cylinder in flow communication with the central passage of said tubular member, a piston mounted for reciprocation in said cylinder, means for supplying liquid to said cylinder, and means for moving said piston a fixed distance in said cylinder to force a predetermined volume of liquid into said inflatable member to inflate said member a predetermined amount.

3. In a holder for a piece of fruit having a cavity formed therein, the combination of a tubular member having a portion adapted to be positioned in the cavity in the fruit, an inflatable member disposed around the projecting portion of said tubular member, means providing lateral passages communicating the interior of said inflatable member with the central passage of said tubular member, a cylinder in flow communication with the central passage of said tubular member, a piston mounted for reciprocation in said cylinder, means for supplying liquid to said cylinder, actuating means for moving said piston a predetermined distance in said cylinder to force a predetermined volume of liquid into said inflatable member, and adjustment means associated with said actuating means for changing the distance said piston moves under the urging of said actuating means.

4. In a holder for fruit having a cavity of globular configuration formed therein, the combination of an elongated member having a portion adapted to be positioned in the cavity of the fruit, an inflatable member on said elongated member having a globular configuration when inflated adapting said inflatable member to engage the entire surface that defines the cavity in the fruit, and means in communication with the interior of said inflatable member for inflating said inflatable member to thereby hold the fruit against movement relative to said support member.

5. In a machine for peeling a fruit having a seed cell cavity providing substantially transversely extending opposed wall surfaces, the combination of an elongated member having a portion adapted to be positioned in the fruit cavity, an inflatable member on said portion of said elongated member and having a configuration when inflated adapting said inflatable member to firmly engage the substantially transversely extending opposed wall surfaces of the cavity, and means for inflating said inflatable member to hold the fruit against movement axially on said elongated member when a force directed longitudinally of the fruit is applied to the fruit during peeling thereof.

References Cited in the file of this patent

UNITED STATES PATENTS 2,425,928     Emerson _____ Aug. 19, 1947

FOREIGN PATENTS 1,044,075     France _____ June 17, 1953